US012680827B2

(12) United States Patent　　　　(10) Patent No.:　US 12,680,827 B2
Hofmann et al.　　　　　　　　　　(45) Date of Patent:　　　Jul. 14, 2026

(54) METHOD, APPARATUS, AND COMPUTER PROGRAM PRODUCT FOR IDENTIFYING TURNING CIRCLES AND GENERATING TURNING CIRCLES IN MAP DATA

(71) Applicant: HERE Global B.V., Eindhoven (NL)

(72) Inventors: Hilko Hofmann, Schwalbach am Taunus (DE); Mykola Driuchatyi, Odesa (UA)

(73) Assignee: HERE GLOBAL B.V., Eindhoven (NL)

( * ) Notice: Subject to any disclaimer, the term of this patent is extended or adjusted under 35 U.S.C. 154(b) by 102 days.

(21) Appl. No.: 18/394,450

(22) Filed: Dec. 22, 2023

(65) Prior Publication Data

US 2025/0207938 A1　　Jun. 26, 2025

(51) Int. Cl.
G01C 21/00　　　　(2006.01)
(52) U.S. Cl.
CPC ..... G01C 21/3819 (2020.08); G01C 21/3822 (2020.08); G01C 21/3852 (2020.08)
(58) Field of Classification Search
CPC ........................ G01C 21/3819; G01C 21/3852
See application file for complete search history.

(56) References Cited

U.S. PATENT DOCUMENTS 8,392,457 B1　　3/2013　Bender et al.
2005/0288859 A1* 12/2005　Golding ............. G01C 21/3647
　　　　　　　　　　　　　　　　　701/438

2006/0133699 A1*　6/2006　Widrow ................. G06V 10/70
　　　　　　　　　　　　　　　　　707/E17.02
2009/0144331 A1*　6/2009　Witmer .............. G01C 21/3819
2010/0057336 A1　　3/2010　Levine et al.
2013/0328924 A1* 12/2013　Arikan ............... G01C 21/3815
　　　　　　　　　　　　　　　　　345/629

(Continued)

FOREIGN PATENT DOCUMENTS

CN　　　108986469 B　　12/2018
EP　　　　1111338 B1　　2/2009
JP　　　2006105863 A　　4/2006

OTHER PUBLICATIONS

Singh et al., "Evaluating the performance of map matching algorithms for navigation systems: an empirical study", Spatial Information Research, vol. 27, (Sep. 27, 2018), 12 pages.

(Continued)

*Primary Examiner* — Keith D Bloomquist
(74) *Attorney, Agent, or Firm* — ALSTON & BIRD LLP

(57)　　　　　　　ABSTRACT

A method is provided for analyzing data to identify turning circles within a road network, and to generate map data corresponding to the identified turning circles. Methods may include: receiving data corresponding to a geographical region; identifying, from the data, a turning circle in the geographical region; determining a size of the turning circle; generating, at the point location, map data geometry of the turning circle of the size determined; and updating a digital map database to include the map data geometry of the turning circle of the size determined at the point location, where the digital map database provides for at least one of route guidance or at least semi-autonomous vehicle control. According to some embodiments, the data corresponding to the geographical region includes at least one of satellite imagery or aerial imagery.

20 Claims, 6 Drawing Sheets

(56)         References Cited

U.S. PATENT DOCUMENTS

2018/0188046 A1*   7/2018  Akiva ................... G01C 21/005
2018/0348762 A1*  12/2018  Hilnbrand .............. G01C 21/30
2018/0374360 A1*  12/2018  Miao .................... G05D 1/0246
2020/0172089 A1*   6/2020  Dyer ...................... G08G 1/202
2022/0042821 A1*   2/2022  Patterson ........... G01C 21/3822
2022/0214690 A1*   7/2022  Nichols .............. G01C 21/3492
2023/0266141 A1    8/2023  Liu et al.
2024/0140420 A1*   5/2024  Yoshida .............. B60W 30/143

OTHER PUBLICATIONS

Extended European Search Report for European Application No. 24222376.6 dated Jun. 25, 2025, 11 pages.

* cited by examiner

300

310

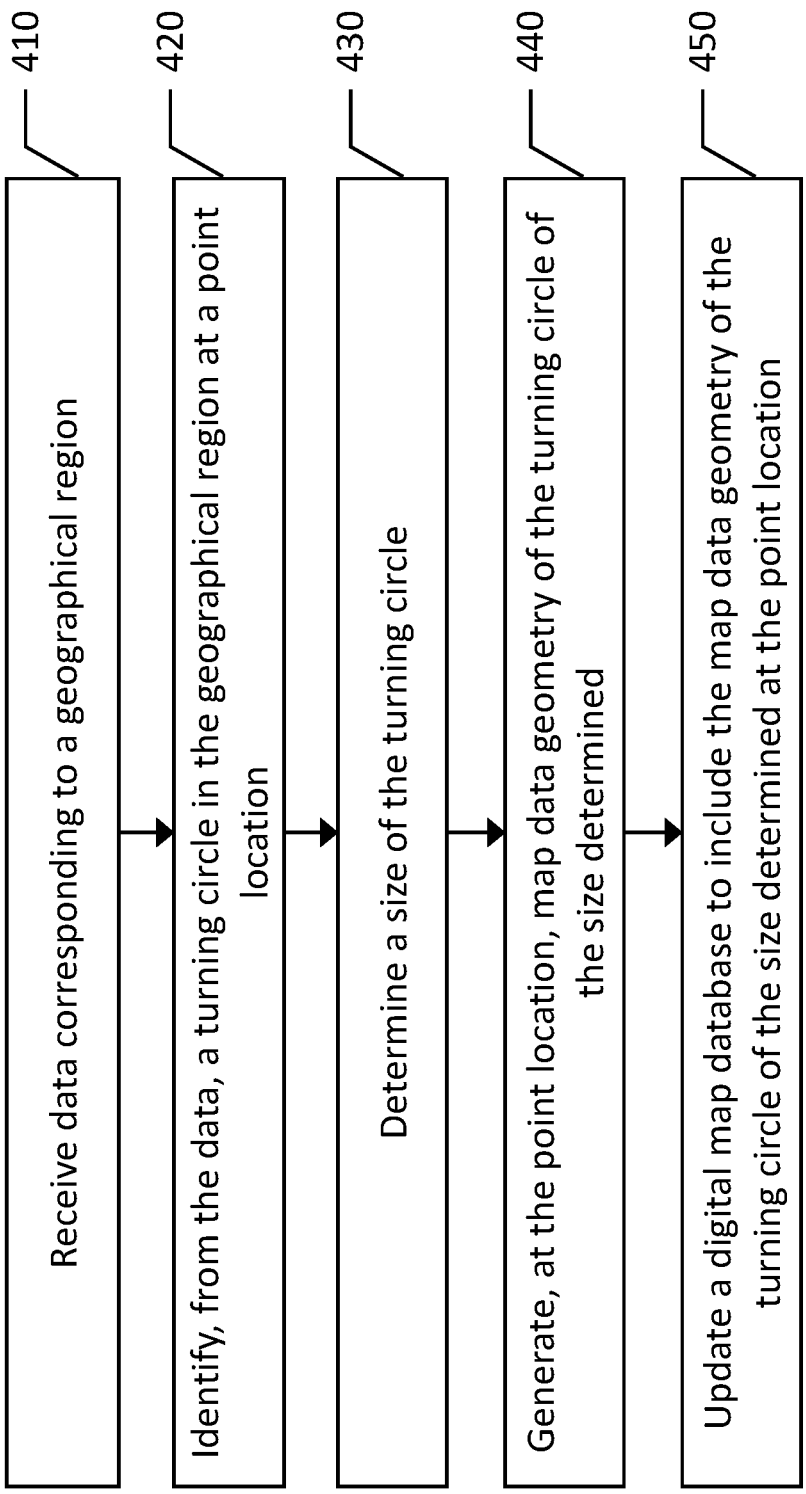

410 — Receive data corresponding to a geographical region

420 — Identify, from the data, a turning circle in the geographical region at a point location 430 — Determine a size of the turning circle 440 — Generate, at the point location, map data geometry of the turning circle of the size determined 450 — Update a digital map database to include the map data geometry of the turning circle of the size determined at the point location

FIG. 6

METHOD, APPARATUS, AND COMPUTER PROGRAM PRODUCT FOR IDENTIFYING TURNING CIRCLES AND GENERATING TURNING CIRCLES IN MAP DATA

TECHNOLOGICAL FIELD

An example embodiment of the present disclosure relates to identifying turning circles and generating corresponding turning circles in map data, and more particularly, to analyzing data to identify turning circles within a road network, and to generate map data corresponding to the identified turning circles.

BACKGROUND

Maps have been used for centuries for providing route geometry and geographical information. Conventional paper maps including static images of roadways and geographic features from a snapshot in history have given way to digital maps used by and presented on computers, mobile devices, vehicles, etc. These digital maps can be updated and revised such that users have the most-current maps available to them each time they view a map hosted by a mapping service server. Digital maps can further be enhanced with dynamic information, such as traffic information in real time along roads and through intersections.

As digital maps, including high-definition (HD) digital maps with rich content can span entire continents, these digital maps include vast amounts of information, which can be corrupted through missing or erroneous data such as missing or erroneous road and/or lane geometry. Incorrect road and lane geometry information can be problematic as such lane geometry may be used for route guidance and at least semi-autonomous vehicle control. Inaccurate road and lane geometries can reduce the effectiveness of route guidance and vehicle autonomy.

BRIEF SUMMARY

A method, apparatus, and computer program product are provided in accordance with an example embodiment for identifying turning circles and generating corresponding turning circles in map data, and more particularly, for analyzing data to identify turning circles within a road network, and to generate map data corresponding to the identified turning circles. Embodiments provided herein include an apparatus having at least one processor and at least one memory including computer program code with the at least one memory and computer program code being configured to, with the processor, cause the apparatus to: receive data corresponding to a geographical region; identify, from the data, a turning circle in the geographical region at a point location; determine a size of the turning circle; generate, at the point location, map data geometry of the turning circle of the size determined; and update a digital map database to include the map data geometry of the turning circle of the size determined at the point location, where the digital map database provides for at least one of route guidance or at least semi-autonomous vehicle control.

According to some embodiments, the data corresponding to the geographical region includes at least one of satellite or aerial imagery. Causing the apparatus of some embodiments to identify the turning circle includes causing the apparatus to identify in the at least one of satellite or aerial imagery the turning circle based on an object detection algorithm applied to the at least one of satellite or aerial imagery. Causing the apparatus of some embodiments to determine the size of the turning circle includes causing the apparatus to determine the size of the turning circle based on a size identified by the object detection algorithm.

According to some embodiments, the data corresponding to the geographical region includes metadata associated with a road network within the geographical region, where causing the apparatus to determine the size of the turning circle includes causing the apparatus to determine the size of the turning circle based on the metadata. The apparatus of some embodiments is further caused to insert, in the map data geometry of the turning circle, at least one map data node and connect the at least one map data node to a road network geometry in the digital map database. Causing the apparatus of some embodiments to determine the size of the turning circle includes causing the apparatus to determine the size of the turning circle by applying a set of rules based on at least one of a number of road segments neighboring the turning circle or a length of road segments neighboring the turning circle.

Embodiments provided herein include a computer program product including at least one non-transitory computer-readable storage medium having computer-executable program code instructions stored therein, the computer-executable program code instructions including program code instructions to: receive data corresponding to a geographical region; identify, from the data, a turning circle in the geographical region at a point location; determine a size of the turning circle; generate, at the point location, map data geometry of the turning circle of the size determined; and update a digital map database to include the map data geometry of the turning circle of the size determined at the point location, where the digital map database provides for at least one of route guidance or at least semi-autonomous vehicle control.

According to some embodiments, the data corresponding to the geographical region includes at least one of satellite or aerial imagery. The program code instructions to identify the turning circle include, in some embodiments, program code instructions to identify in the at least one of satellite or aerial imagery the turning circle based on an object detection algorithm applied to the at least one of satellite or aerial imagery. The program code instructions to determine the size of the turning circle includes, in some embodiments, program code instructions to determine the size of the turning circle based on a size identified by the object detection algorithm.

According to certain embodiments, the data corresponding to the geographical region includes metadata associated with a road network within the geographical region, and where the program code instructions to determine the size of the turning circle include program code instructions to determine the size of the turning circle based on the metadata. The computer program product of some embodiments further includes program code instructions to insert, in the map data geometry of the turning circle, at least one map data node and connect the at least one map data node to a road network geometry in the digital map database. The program code instructions to determine the size of the turning circle include, in some embodiments, program code instructions to determine the size of the turning circle by applying a set of rules based on at least one of a number of road segments neighboring the turning circle or a length of road segments neighboring the turning circle.

Embodiments provided herein include a method including: receiving data corresponding to a geographical region; identifying, from the data, a turning circle in the geographical region; determining a size of the turning circle; generating, at the point location, map data geometry of the turning circle of the size determined; and updating a digital map database to include the map data geometry of the turning circle of the size determined at the point location, where the digital map database provides for at least one of route guidance or at least semi-autonomous vehicle control. According to some embodiments, the data corresponding to the geographical region includes at least one of satellite imagery or aerial imagery.

According to some embodiments, identifying the turning circle includes identifying in the at least one of satellite or aerial imagery the turning circle based on an object detection algorithm applied to the at least one of satellite or aerial imagery. According to certain embodiments, determining the size of the turning circle includes determining the size of the turning circle based on a size identified by the object detection algorithm. According to certain embodiments, the data corresponding to the geographical region includes metadata associated with the road network within the geographical region, where determining the size of the turning circle includes determining the size of the turning circle based on the metadata. The method of some embodiments further includes inserting, in the map data geometry of the turning circle, at least one map data node, and connecting the at least one map data node to a road network geometry in the digital map database. Further, a computer program product may be provided. For example, a computer program product comprising instructions which, when the program is executed by a computer, cause the computer to carry out the steps described herein.

Embodiments provided herein include an apparatus including: means for receiving data corresponding to a geographical region; means for identifying, from the data, a turning circle in the geographical region; means for determining a size of the turning circle; means for generating, at the point location, map data geometry of the turning circle of the size determined; and updating a digital map database to include the map data geometry of the turning circle of the size means for determined at the point location, where the digital map database provides for at least one of route guidance or at least semi-autonomous vehicle control. According to some embodiments, the data corresponding to the geographical region includes at least one of satellite imagery or aerial imagery.

According to some embodiments, the means for identifying the turning circle includes means for identifying in the at least one of satellite or aerial imagery the turning circle based on an object detection algorithm applied to the at least one of satellite or aerial imagery. According to certain embodiments, the means for determining the size of the turning circle includes means for determining the size of the turning circle based on a size identified by the object detection algorithm. According to certain embodiments, the data corresponding to the geographical region includes metadata associated with the road network within the geographical region, where the means for determining the size of the turning circle includes means for determining the size of the turning circle based on the metadata. The apparatus of some embodiments further includes means for inserting, in the map data geometry of the turning circle, at least one map data node, and means for connecting the at least one map data node to a road network geometry in the digital map database.

BRIEF DESCRIPTION OF THE DRAWINGS

Figure 1:
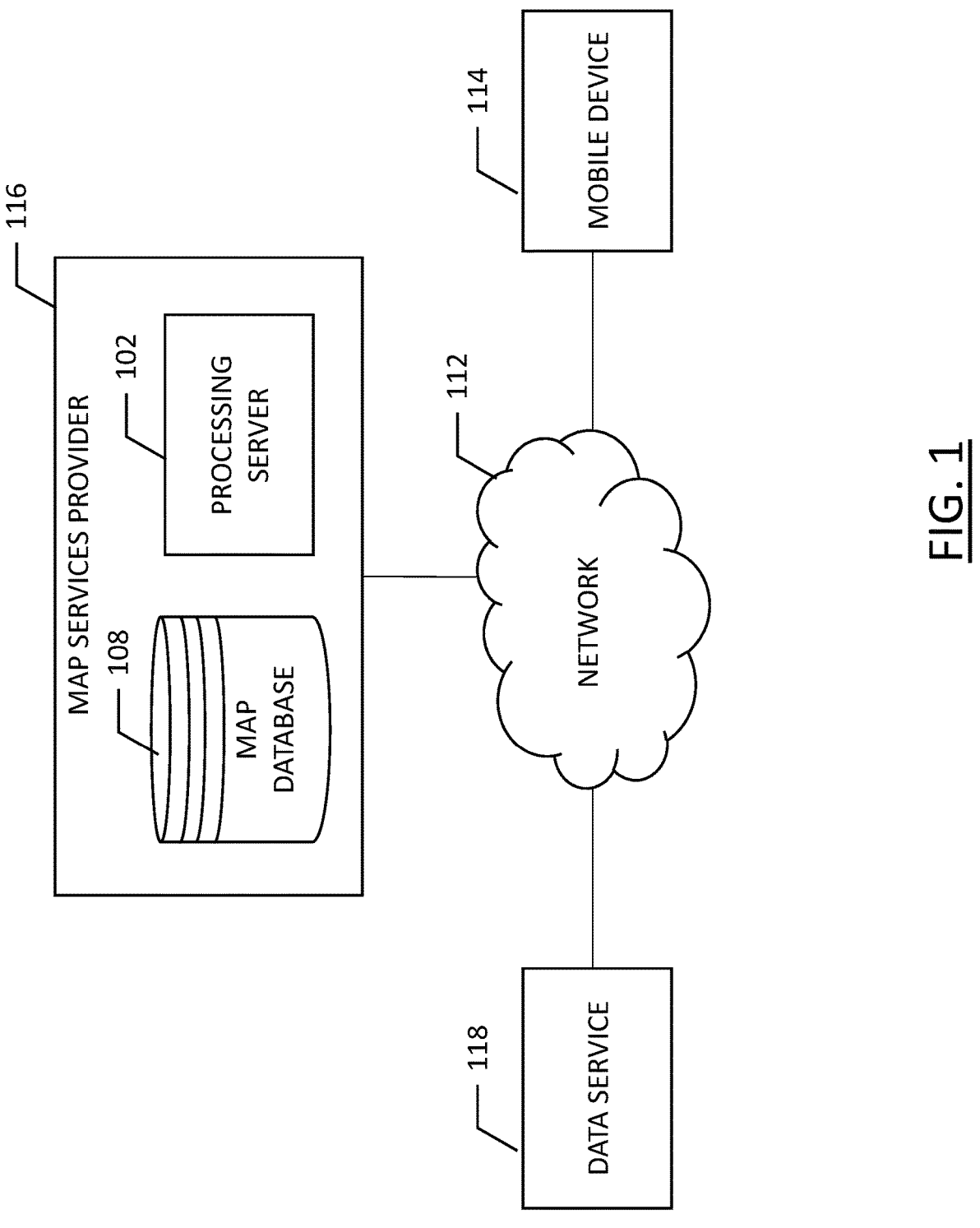
Figure 2:
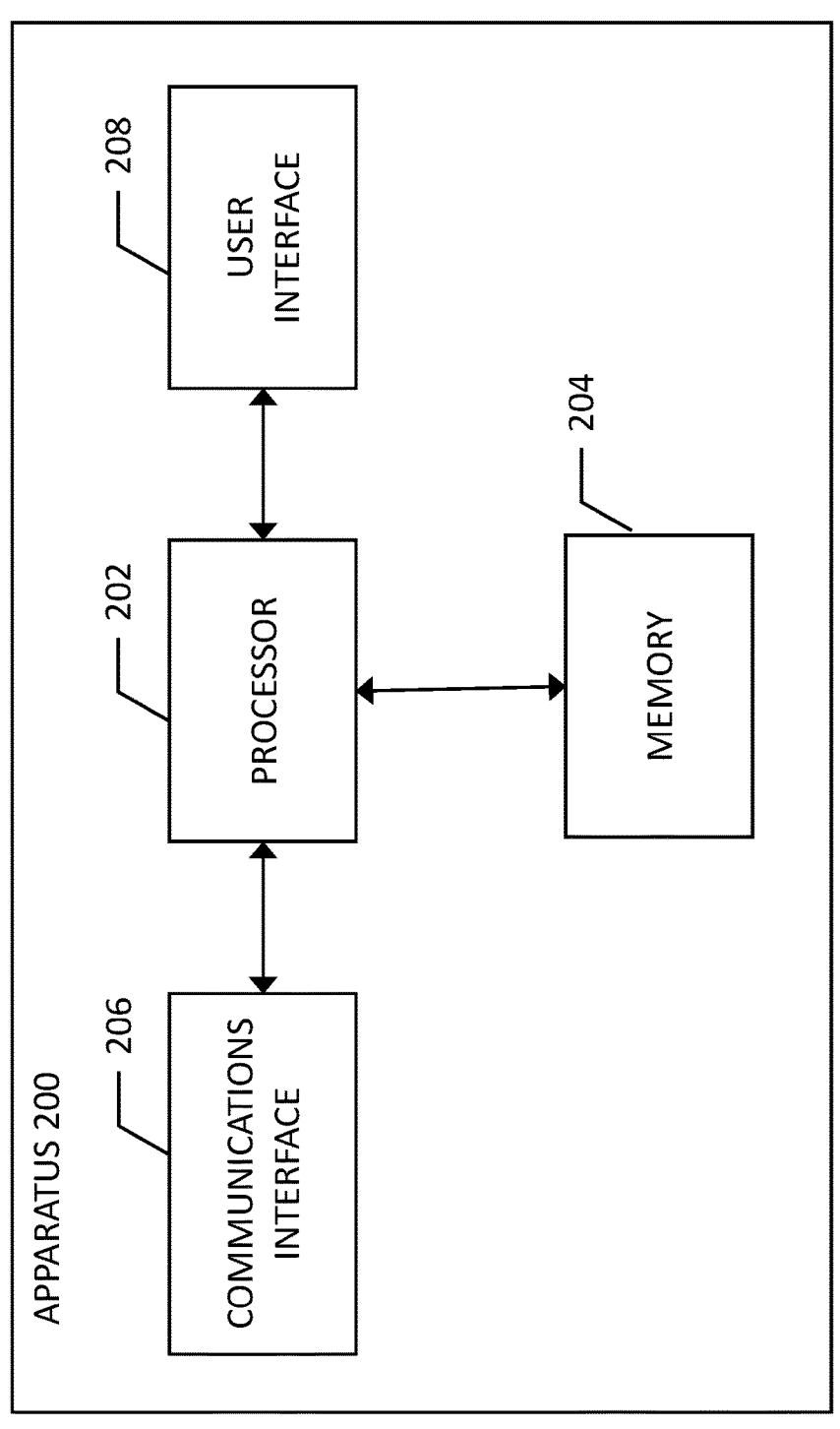
Figure 3:
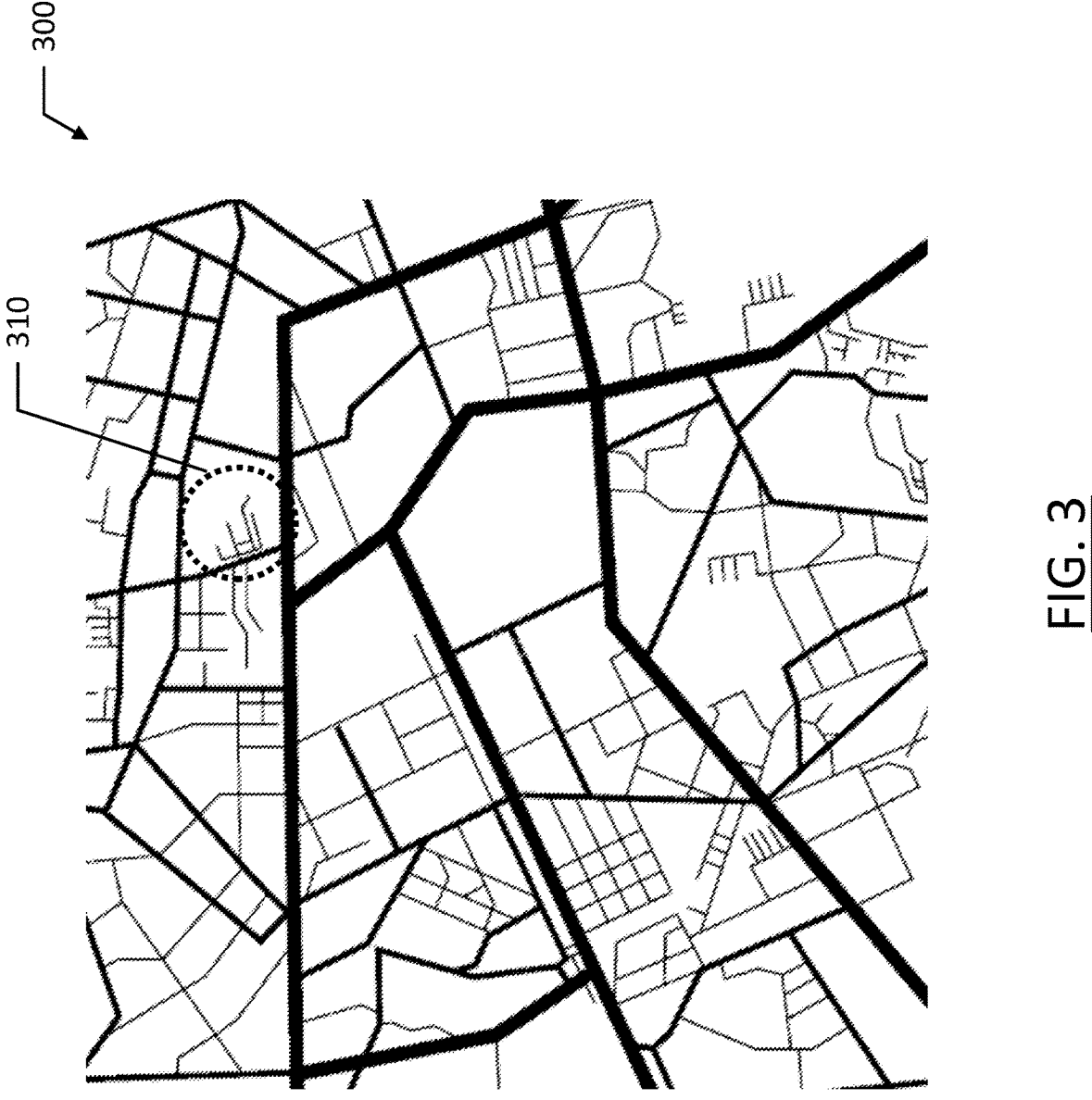
Figure 4:
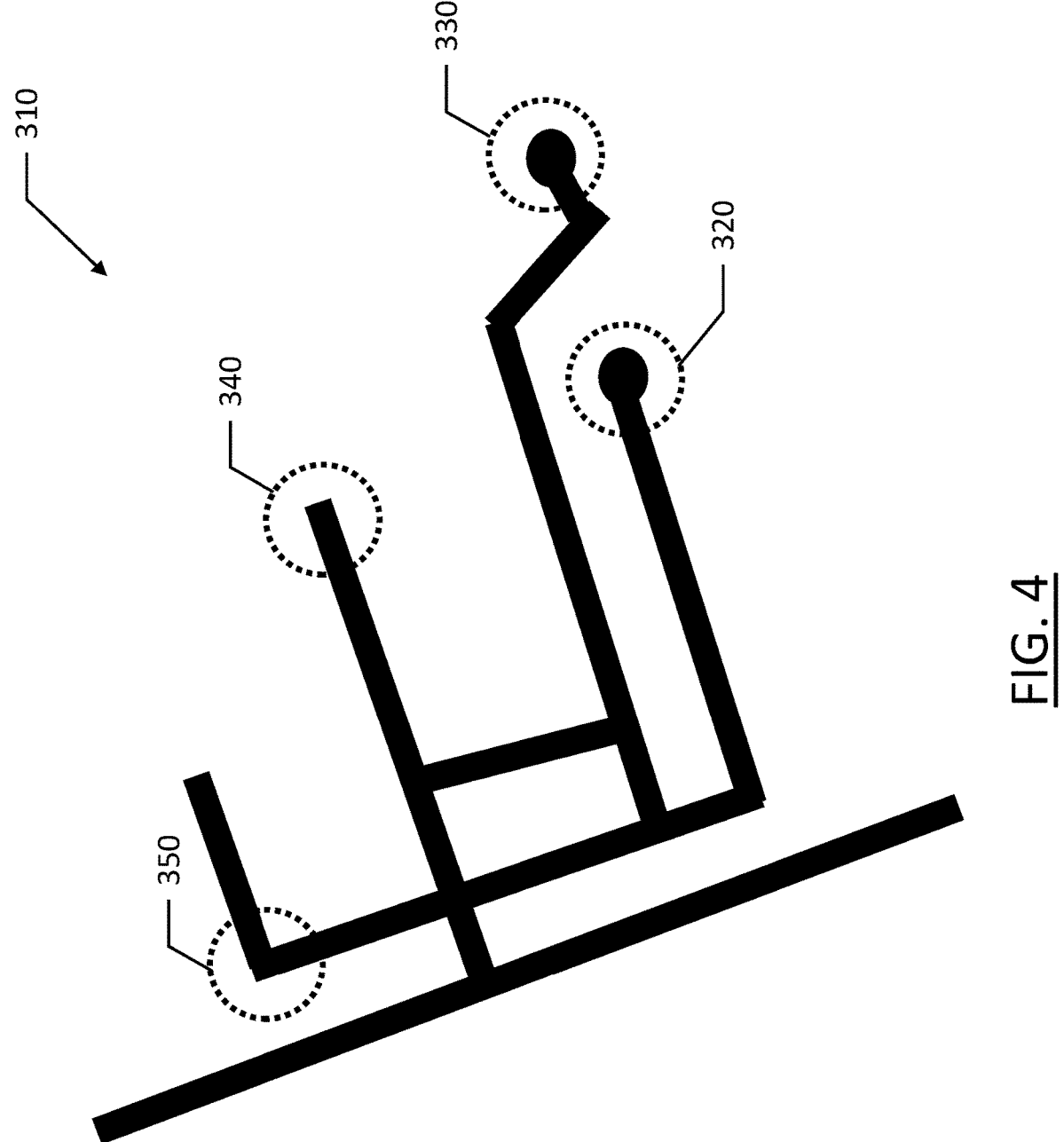
Figure 5:
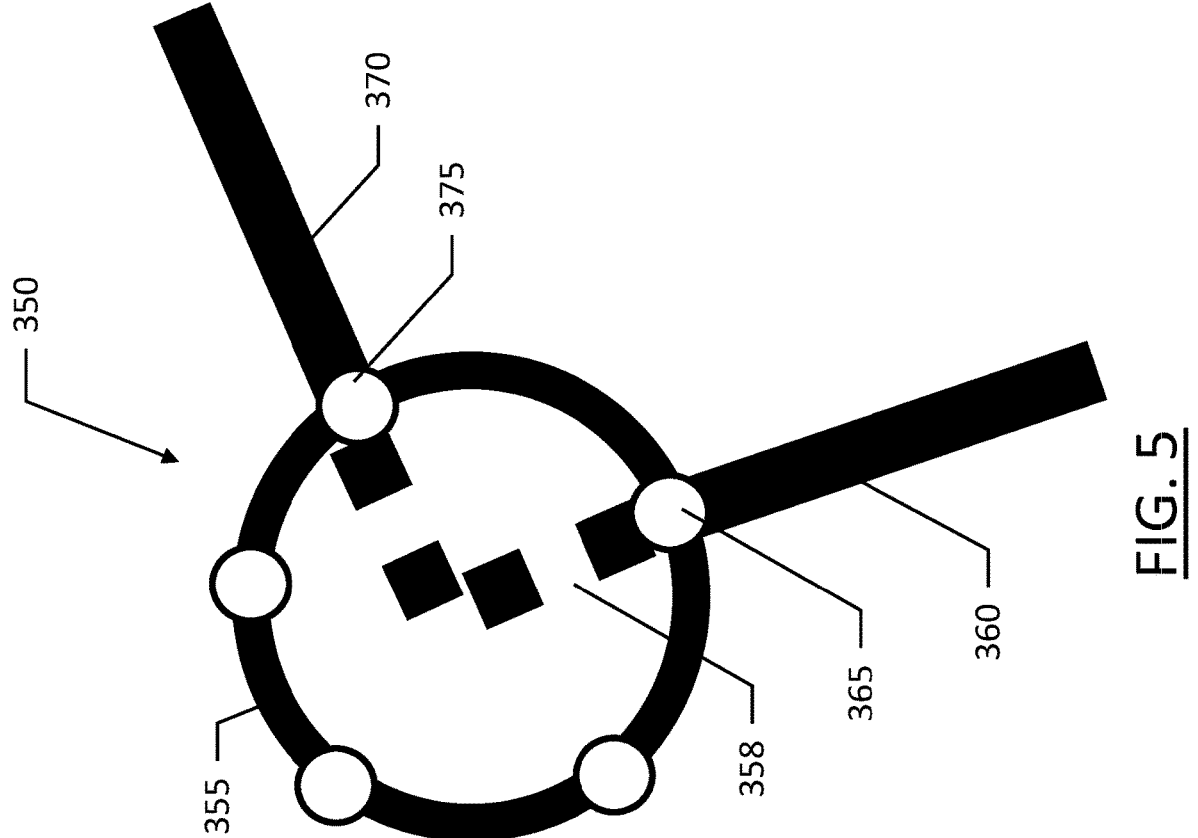

Having thus described example embodiments of the disclosure in general terms, reference will now be made to the accompanying drawings, which are not necessarily drawn to scale, and wherein:

FIG. 1 illustrates a communication diagram of a system for implementing example embodiments described herein according to an example embodiment of the present disclosure;

FIG. 2 is a block diagram of an apparatus for identifying turning circles and generating map data corresponding to the turning circles according to an example embodiment of the present disclosure;

FIG. 3 illustrates a mapped region including road segments of a map database according to an example embodiment of the present disclosure;

FIG. 4 illustrates an enlarged view of a portion of the mapped area of FIG. 3 according to an example embodiment of the present disclosure;

FIG. 5 illustrates an enlarged view of an area of the mapped region including a turning circle according to an example embodiment of the present disclosure; and FIG. 6 is a flowchart of a method for identifying turning circles and generating corresponding turning circles in map data according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A system, method, apparatus, and computer program product are provided herein in accordance with an example embodiment for identifying turning circles and generating corresponding turning circles in map data, and more particularly, for analyzing data to identify turning circles within a road network, and to generate map data corresponding to the identified turning circles. Road geometries in a road network typically include a node at the end of a road segment or between road segments that lacks any specific geometry. At the ends of some roads and between some road segments (e.g., rural drives, single lane roads, etc.) there exists a region that is larger or wider than a typical lane, as it may be used to turn around or to complete a wide turn on a tight corner. These areas that enable a vehicle to maneuver such as with a turn-around or U-turn are referred to herein as turning circles. These areas are generally circular areas in a road or at the end of a road. The term "turning circle" as used herein may refer to a physical space of a variety of shapes, with the physical space in a road or at the end of a road facilitating a vehicle turning circle. As such, these areas may be rectangular, polygonal, amorphic, or the like to enable a vehicle to turn within the physical space. Thus, the term "turning circles" is not limiting of the physical space within which turning circles are identified. Turning circles are distinct from roundabouts as they generally do not have a central median that is not traversable. Some cul-de-sacs do have such a central median; however, they lack more than one road segment connecting to the cul-de-sac. These cul-de-sacs are also considered turning circles.

Road geometries typically have only nodes at locations where turning circles exist. However, a node representation of a turning circle does not accommodate for maneuvering around the turning circle or the ability for a vehicle to perform a maneuver. While turning within a turning circle is a straightforward task for a driver at the location, a routing engine would not consider such maneuvers. For example, the Dijkstra algorithm would consider that this node does not lead to the destination, such that the node is discarded. Such a maneuver would be of use in cases where a change of direction is needed to make a legal turn, for example. Turning circles would also be of benefit in an instance when a routing algorithm is rerouting and may require a vehicle to turn around. Further, some turning circles may also be provided for connections to pedestrian paths around a cul-de-sac which are usually not connected to a turning circle. Such connections are necessary for properly supporting pedestrian navigation use cases.

Surveying areas to identify turning circles with sensor-equipped vehicles is increasingly expensive, and turning circles are generally found in lower priority, lower functional class roads in residential areas which cannot be effectively surveyed and updated with the needed regularity. Embodiments described herein find point-like turning circle objects in a mapped environment and convert these into discrete-sized circles. Depending upon a number of neighboring features, a set of rules is applied to select the size of the circle and a number of nodes for connecting intersecting paths are inserted into the circle road of the turning circle. This automated process reliably and efficiently improves map geometry such that road geometry is more reliable and can be more readily used for navigational assistance and for autonomous vehicle control.

FIG. 1 illustrates a communication diagram of an example embodiment of a system for implementing example embodiments described herein. The illustrated embodiment of FIG. 1 includes a map services provider system 116, a processing server 102 in data communication with a geographic map database, e.g., map database 108 through a network 112, a data service 118, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully autonomous vehicle, the ADAS uses the digital map data to determine a path along the road network to drive, such that accurate representations of the road are necessary, such as accurate representations of intersections and turn paths there through. Thus, it is important to have continuous features remain continuous within the map data as provided by embodiments herein.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. Also, remote sensing, such as aerial or satellite photography, can be used to generate map geometries directly or through machine learning as described herein. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

The data service 118 may provide data to the map services provider 116 via the network 112 to inform the map database 108 and processing server 102 of information to facilitate the identification of turning circles as described herein. The data service 118 may include, for example, OpenStreetMap data which is an open-source geographic database updated and maintained by contributors based on surveys, aerial imagery, and other data. The data service 118 fan further include a source of aerial and satellite imagery or any data sources that may provide information relevant to the identification of turning circles within a road network.

As mentioned above, the server-side map database 108 may be a master geographic database, but in alternate embodiments, a client-side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

While the mobile device 114 may be used by an end-user for navigation, driver assistance, or various other features, the mobile device 114 may provide map data to the map services provider 116 for purposes of updating, building, restoring, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data," may be collected by any device capable of determining the necessary information and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for revising map geometry based on a detailed analysis of probe data and existing map geometry. The apparatus may include or otherwise be in communication with a processor 202, a memory 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Embodiments described herein can further employ a processer embodied by a Graphics Processing Unit (GPU) specifically configured for neural network implementations and/or image processing capitalizing on efficient processing capabilities using multiple parallel operations. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory 204, and/or the like).

Embodiments described herein identify point-like turning circle objects in map data and convert them to discrete-sized circles. Depending on the number of neighboring features, a set of rules is applied to select the size of the circle and a number of nodes for connecting intersecting paths is inserted into the turning circle road. An example embodiment of the process is described herein. Turning circle nodes are collected or identified by pre-existing metadata from source data or by analyzing other sources of data, such as aerial or satellite imagery or any other source data that can identify a point location in a map as a turning circle. The point location can be identified or referenced, for example, by a coordinate pair (e.g., latitude and longitude) or otherwise identified as a geographic position within a region. A node identified as a turning circle is marked as such. A road with a node marked as a turning circle cannot be fused together with another road at the turning circle position if the turning circle is at the start or end of a road where two roads connect. If the turning circle is between the start and end of a road, the road is split at the turning circle position. The turning circle node is then converted into a circle with a specified radius. All intersections with the turning circle with existing geometry (roads) are detected and intersection points used to connect the circle with the roads. Road elements inside of the turning circle are removed such that the road geometry directly connects to the circle. The circle can then be split into individual road segments that go from one intersection with the road network to the next. The circle segments are then marked as turning circle segments or mini-roundabout segments depending on the data format used for storage. This updated map geometry can then be used for navigational assistance and for autonomous vehicle control.

The identification of a turning circle in a road network can be performed in a number of ways. Pre-existing metadata from source data of a road network may identify a node as a turning circle; however, the node may not have any distinct geometry. A node may be identified based on a node identifier (e.g., NodeID) of a map database and can include attributes such as a location identified via coordinate pair, an attribute indicating it is a turning circle, or other attributes as described below. Other mechanisms for identifying turning circles include probe data collected by vehicles traversing a region. Such collected data can identify paths a vehicle has taken. Accumulating probe data can identify certain locations as turning circles. Further, image data, such as satellite or otherwise aerial imagery of the geographical region may be analyzed to identify turning circles. This may involve the use of object detection algorithms and image processing. Machine learning can be employed such as using a convolutional neural network or deep neural network to identify turning circles in image data based on training data used by the machine learning model to accurately identify turning circles in a road network. For example, an image object detector may identify portions on an aerial or satellite image depicting a turning circle by generating a bounding box encompassing the turning circle and providing associated coordinates of the bounding box, e.g., referencing the image in cartesian coordinates (x,y) or the location in geographical coordinates (lat,lon).

When metadata and aerial images are not available, or to supplement metadata and aerial images, probe data from sensors of vehicles traveling within a road network can be used to aid in identifying turning circles. Probe data gathered from a plurality of probes traveling within a road network can be used to produce histogram images which can be filtered and/or analyzed to discover turning circles within a road network. The probe histogram images can be used as input to a probe point analysis such as using principal component analysis (PCA), Bayesian filtering, generator model, or other suitable method to determine road geometry to identify areas that may include turning circles. An example of such detection may include sets of pairs of consecutive probe data points from the same device changing direction of about 180-degrees within a timeframe that would rule out a three-point turn. Once a turning circle is identified, a node at the location of the turning circle is flagged or marked as a turning circle for processing further as described below.

For nodes identified as turning circles, the properties or features of the node are identified. These include identification of road segments attached to the node, a length of road segments attached to the node, width of road segments attached to the node, metadata associated with the node (e.g. functional class, speed limit, weight limit, etc.), or a location context of the node (e.g., urban, rural, industrial, commercial, residential, etc.). Based on these identified features of the turning circle node, a radius of the turning circle is determined. Local regulations are also considered, as local regulations may dictate minimum or maximum turning circle dimensions (e.g., diameter). For example, in an industrial area, a turning circle may be required to be of a diameter sufficient to enable a truck to turn around. This may be an example of a non-circular physical footprint of an area in which a turning circle is established, as described above. This local regulation may supersede or be in addition to the calculations described herein. To establish a diameter of a turning circle at a node, a length of the roads connected to the node is established, and a shortest road connected to the turning circle is iteratively found.

A routing engine may be vehicle-specific, and aware of a type of vehicle being guided or otherwise controlled. For example, a routing engine providing routing or control of a compact vehicle may be able to recommend routes through turning circles having relatively small radii. However, a routing engine providing routing or control of a large vehicle, such as a semi-truck and trailer, may understand that a very large turning circle is required for a turn-around, and thus only recommend such turnarounds in turning circles having a correspondingly large radius.

A shortest road connected to a turning circle node can be used to determine, at least in part, a diameter of the turning circle. If a shortest road connected to a turning circle node is less than 1.5 meters, the turning circle may be skipped, as it would have too small of a geometry to actually become a mapped turning circle. Longer roads connected to a turning circle may merit a turning circle generated at the node. The smaller a radius chosen for the turning circle, the turning circle can have fewer points or nodes within the circle. A minimum number of points may be five to obtain a circle. The maximum number of points may be determined based on the minimum length of road segments between two points of the turning circle. The filtering of shortest road segments connected to a node is necessary as features too short in length cannot intersect with the artificially created turning circle, and there is no way to process such turning circle nodes. Hence, the process described herein may begin with a larger radius. All road shorter than the threshold (e.g., 1.5 meters) may be skipped and the node remains as-is. These thresholds and lengths may be tunable according to the requirements of the implementation. An artificial circle is generated to form the turning circle based on the determined radius of the turning circle at the node. In an example, the radius of the turning circle may be set, under the above considerations, within a predefined range (e.g., 1 m, 1.5 m, 2 m, 2.5, 3 m, 3.5 m, 4 m, 4.5 m) with additional or less values, with irregular spacing between values, and the like. According to an example embodiment, the node at which the turning circle is made is removed and replaced with the turning circle. The node identifier for the node at which the turning circle was formed may be retained in the turning circle node identifiers, for example.

Intersection points for road segments intersecting with the generated turning circle are then computed. If the number of intersecting road segments is more than one, then the turning circle is split at intersection points into road segments forming the turning circle. Otherwise the whole turning circle is used as one road segment from the intersection point back to the intersection point. If an intersection point of a road segment is closer than a predefined threshold from a next point on the turning circle, the next point is moved to the intersection point. This threshold may be, for example, 0.1 to 0.5 meters. This is performed so that the original vector of the road segment is not changed, and there is no resultant very short segment of the turning circle. The predefined threshold is tunable according to the requirements of the implementation and may differ based on context and location of the turning circle. The turning circle segments are saved as part of the road geometry, and a digital map database can be updated with the updated road geometry. Unique permanent identifiers are generated for the turning circle segments. For example:

<NODE_ID>:<START_IDX>:<END_IDX>, where NODE_ID is the turning circle node identifier, START_IDX is the turning circle starting vertex, and END_IDX is the turning circle ending vertex.

FIG. 3 illustrates an example embodiment of a mapped region 300 including an area having turning circles identified by area 310. FIG. 4 illustrates an enlarged view of the mapped area 310. As shown, there are four turning circles identified. Turning circles 320 and 330 may be identified based on image analysis as they each include a geometry that suggests a turning circle is present. Alternatively or additionally, the identification of the turning circle may be in metadata associated with the source data, such as within the node identifier. Turning circles 340 and 350 do not appear from the image to have turning circle geometry; however, they are identified as turning circles through other data.

Generating map geometry for turning circle 320 involves identifying the attached road segment, and based features of the turning circle including the attached road segment, the map data geometry of the turning circle is established. In the case of turning circle 320, the attached road segment is of significant length and is the only attached road segment. The turning circle map data geometry may be informed based on the context of the node, such as if it is a residential area versus an industrial area. Based on the features of the node, the turning circle geometry is generated. The map data can be provided to a map database for updating the digital map, thereby providing useful information for navigational guidance and autonomous vehicle control.

A turning circle at 350 may be identified, for example, through metadata, probe data, aerial imagery, or other data sources. The turning circle generation for turning circle 350 identifies the road segments attached to the node forming the turning circle, which in this case includes two road segments. The length of these road segments is considered, along with other features of the node to establish a turning circle radius. Based on this radius, map data geometry corresponding to the turning circle is generated and used to update a map database.

FIG. 5 illustrates an enlarged view of turning circle 350 having map geometry formed as described herein. Once the radius of the turning circle is established, the turning circle 355 is formed centered on the node from which the turning circle was formed. Portions 358 of the road segments within the turning circle are cut off, and road segments 360 and 370 are joined to the turning circle at nodes 365 and 375, respectively. The map geometry of the turning circle is used to update the map database, such that route guidance and autonomous vehicle control can recognize the turning circle as a location where a vehicle can change direction and perform a U-turn as needed. This enhancement to the digital map database provides for improved efficiency in routing and autonomous control by increasing the available maneuvers for traversing a road network.

Embodiments described herein provide an improvement to the operation of routing engines and computing devices calculating routes from an origin to a destination. This improvement enables routing engines and navigational systems to determine routes within a road network in a more efficient and effective manner by including locations where vehicles may complete a turn, such as a U-turn, within the road network, thereby providing a substantial increase in the routing options for such systems. Vehicle navigation routes, particularly those that are generated "on-the-fly" or as a vehicle is traveling within a road network can require a vehicle to change direction, such as turning around, where there is no suitable U-turn maneuver location proximate the location of the vehicle. A routing engine, such as one based on Dijkstra, A* algorithms, or the like, aims to provide a minimum traversal cost solution to achieve the directional change. In a simple road network layout, such as an urban grid, a standard solution would result in the routing engine providing a path around a block to change direction on a single road. This entails traversing three additional street segments with three turns involved. With short street segments between cross-streets of a 50 meter length, this still results in an additional 150 meter cost to the route, plus any time lost waiting at intersections such as at traffic lights. By providing maneuverable geometries directly on the turning circle, a routing engine will be able to consider the traversal cost of performing a U-turn to be a distance (e.g., 2*pi*TurningCircleRadius), which is typically significantly lower than circling a block or taking additional road segments to accomplish the directional change. Besides time savings, energy/emissions savings, and overall convenience of a vehicle traversing a shorter route, no changes to the routing engine are necessary other than including handling of nodes identified as turning circles.

FIG. 6 illustrates a flowchart depicting methods according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems that perform the specified functions, or combinations of special purpose hardware and computer instructions.

An operation of an example apparatus will herein be described with reference to the flow chart of FIG. 6. The illustrated method may be performed, for example, by apparatus 200 using processor 202 with program code instructions stored in memory 204 to cause the apparatus to perform the operations of the method of FIG. 6. As shown, apparatus is caused to receive data corresponding to a geographical region at 410. From the data, a turning circle is identified at 420 at a point location within the geographical region. A turning circle size is determined at 430. At the point location in the geographical region, map data geometry of the turning circle of the determined size is generated at 440. A digital map database is updated at 450 to include the turning circle of the determined size at the point location in the geographical region.

In an example embodiment, an apparatus for performing the method of FIG. 6 above may include a processor (e.g., the processor 202) configured to perform some or each of the operations (410-450) described above. The processor may, for example, be configured to perform the operations (410-450) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-450 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
    receive data corresponding to a geographical region;
    identify, from the data, a turning circle in the geographical region at a point location identified by a node in map data, wherein the turning circle is distinct from a roundabout and lacks at least one of a central median or more than one road segment leading to the turning circle, wherein the turning circle is identified based on pre-existing metadata from source data of a road network;
    determine a size of the turning circle;
    generate, at the point location, map data geometry of the turning circle of the size determined to replace the node within the map data; and
    update a digital map database to include the map data geometry of the turning circle of the size determined at the point location, wherein the digital map database provides for at least one of route guidance or at least semi-autonomous vehicle control.

2. The apparatus of claim 1, wherein the data corresponding to the geographical region comprises at least one of satellite or aerial imagery.

3. The apparatus of claim 2, wherein causing the apparatus to identify the turning circle comprises causing the apparatus to identify in the at least one of satellite or aerial imagery the turning circle based on an object detection algorithm applied to the at least one of satellite or aerial imagery.

4. The apparatus of claim 3, wherein causing the apparatus to determine the size of the turning circle comprises causing the apparatus to determine the size of the turning circle based on a size identified by the object detection algorithm.

5. The apparatus of claim 1, wherein the data corresponding to the geographical region comprises metadata associated with a road network within the geographical region, and wherein causing the apparatus to determine the size of the turning circle comprises causing the apparatus to determine the size of the turning circle based on the metadata.

6. The apparatus of claim 1, wherein the apparatus is further caused to:
    insert, in the map data geometry of the turning circle, at least one map data node and connect the at least one map data node to a road network geometry in the digital map database.

7. The apparatus of claim 1, wherein causing the apparatus to determine the size of the turning circle comprises causing the apparatus to determine the size of the turning circle by applying a set of rules based on at least one of a number of road segments neighboring the turning circle or a length of road segments neighboring the turning circle.

8. A computer program product comprising at least one non-transitory computer-readable storage medium having computer-executable program code instructions stored therein, the computer-executable program code instructions comprising program code instructions to:

receive data corresponding to a geographical region;

identify, from the data, a turning circle in the geographical region at a point location identified by a node in map data, wherein the turning circle is identified based on pre-existing metadata from source data of a road network;

determine a radius of the turning circle;

generate, at the point location, map data geometry of the turning circle to replace the node within the map data, wherein the map data geometry comprises a circle having a number of nodes established based on the radius of the turning circle; and update a digital map database to include the map data geometry of the turning circle of the radius determined at the point location, wherein the digital map database provides for at least one of route guidance or at least semi-autonomous vehicle control.

9. The computer program product of claim 8, wherein the data corresponding to the geographical region comprises at least one of satellite or aerial imagery.

10. The computer program product of claim 9, wherein the program code instructions to identify the turning circle comprise program code instructions to identify in the at least one of satellite or aerial imagery the turning circle based on an object detection algorithm applied to the at least one of satellite or aerial imagery.

11. The computer program product of claim 10, wherein the program code instructions to determine the radius of the turning circle comprise program code instructions to determine the radius of the turning circle based on a size identified by the object detection algorithm.

12. The computer program product of claim 8, wherein the data corresponding to the geographical region comprises metadata associated with a road network within the geographical region, and wherein the program code instructions to determine the radius of the turning circle comprise program code instructions to determine the radius of the turning circle based on the metadata.

13. The computer program product of claim 8, further comprising program code instructions to:

insert, in the map data geometry of the turning circle, at least one map data node and connect the at least one map data node to a road network geometry in the digital map database.

14. The computer program product of claim 8, wherein the program code instructions to determine the radius of the turning circle comprise program code instructions to determine the radius of the turning circle by applying a set of rules based on at least one of a number of road segments neighboring the turning circle or a length of road segments neighboring the turning circle.

15. A method comprising:

receiving data corresponding to a geographical region;

identifying, from the data, a turning circle in the geographical region at a point location identified by a node in map data, wherein the turning circle is identified based on pre-existing metadata from source data of a road network;

determining a size of the turning circle based, at least in part, on a length of at least one road segment leading to the turning circle;

generating, at the point location, map data geometry of the turning circle of the size determined to replace the node within the map data; and updating a digital map database to include the map data geometry of the turning circle of the size determined at the point location, wherein the digital map database provides for at least one of route guidance or at least semi-autonomous vehicle control.

16. The method of claim 15, wherein the data corresponding to the geographical region comprises at least one of satellite or aerial imagery.

17. The method of claim 16, wherein identifying the turning circle comprises identifying in the at least one of satellite or aerial imagery the turning circle based on an object detection algorithm applied to the at least one of satellite or aerial imagery.

18. The method of claim 17, wherein determining the size of the turning circle comprises determining the size of the turning circle based on a size identified by the object detection algorithm.

19. The method of claim 15, wherein the data corresponding to the geographical region comprises metadata associated with a road network within the geographical region, and wherein determining the size of the turning circle comprises determining the size of the turning circle based on the metadata.

20. The method of claim 15, further comprising:

inserting, in the map data geometry of the turning circle, at least one map data node and connecting the at least one map data node to a road network geometry in the digital map database.

* * * * *